United States Patent [19]
Rouffet et al.

[11] Patent Number: 5,668,556
[45] Date of Patent: Sep. 16, 1997

[54] LOW-ORBIT SATELLITE COMMUNICATIONS SYSTEM FOR TERMINALS

[75] Inventors: Denis Rouffet, Boulogne Billancourt; Frédéric Berthault, Paris; Michel Mazzella, St. Germain en Laye; Yannick Tanguy, Paris, all of France

[73] Assignee: Alcatel Espace, Courbevoie, France

[21] Appl. No.: 661,707

[22] Filed: Jun. 11, 1996

Related U.S. Application Data

[63] Continuation of Ser. No. 66,147, filed as PCT/FR92/00911, Oct. 1, 1992, abandoned.

[30] Foreign Application Priority Data

Oct. 2, 1991 [FR] France ................. 91 12119

[51] Int. Cl.[6] .................. H04B 7/185; H04B 1/56
[52] U.S. Cl. .................. 342/354; 342/352; 455/12.1; 455/13.3; 370/294
[58] Field of Search .................. 342/354, 353, 342/352; 455/12.1, 13.1, 13.2, 13.3; 370/29, 104.1

[56] References Cited

U.S. PATENT DOCUMENTS

| | | | |
|---|---|---|---|
| 3,678,387 | 7/1972 | Wilson | 342/352 |
| 3,789,142 | 1/1974 | Shimasaki et al. | 455/13.3 |
| 4,259,741 | 3/1981 | Kawai | 455/12 |
| 4,285,064 | 8/1981 | Hodge | 455/13 |
| 4,287,588 | 9/1981 | Segner | 370/29 |
| 4,292,683 | 9/1981 | Jueneman | 370/104 |
| 4,381,562 | 4/1983 | Acampora | 370/97 |
| 4,800,561 | 1/1989 | Ishi | 370/104 |
| 4,931,802 | 6/1990 | Assal et al. | 342/356 |
| 5,138,631 | 8/1992 | Taylor | 375/1 |

FOREIGN PATENT DOCUMENTS

| | | |
|---|---|---|
| 0365885 | 5/1990 | European Pat. Off. . |
| 0421698 | 4/1991 | European Pat. Off. . |
| 2129898 | 11/1972 | France . |
| WO8801457 | 2/1988 | WIPO . |
| WO8804866 | 6/1988 | WIPO . |

OTHER PUBLICATIONS

National Telecommunications Conference, vol. 1/4, Nov. 30, 1980, Houston, US; P.R. Hirschler–Marchand et al: "system design and technology development for an EHF beam–hopped satellite downlink".

IEEE Conference on Satellites Systems Per Mobile Communications and Surveillance, vol. 95, 1973, pp. 35–38 J.G. Walker: "Continuous Whole Earth Coverage by Circular Orbit Satellites".

Dragone et al, "New Techniques for the Design of Communication Satellite and Earth Station Antennas", Jun. 1980, Int'l Conf. on Comm. pp. 25.5.1–25.5.7.

Reudink et al, Conf. Proceedings of the 8th European Microwave Conf. Paris, France, 4–8 Sep. 1978.

Primary Examiner—Gregory C. Issing
Attorney, Agent, or Firm—Sughrue, Mion, Zinn, Macpeak & Seas

[57] ABSTRACT

The present invention relates to a communications system between low-orbit satellites and terminals, in which the beams (12) of each service area (14) are illuminated according to a beam-hopping spatial scanning. For each satellite and for each terminal transmission and reception are separated in time and synchronized. Time-division duplex is used. Applicable especially to the field of space telecommunications.

26 Claims, 5 Drawing Sheets

LOW-ORBIT SATELLITE COMMUNICATIONS SYSTEM FOR TERMINALS

This is a Continuation of U.S. application No. 08/066,147, filed as PCT/FR92/00911, Oct. 1, 1992, now abandoned.

BACKGROUND OF THE INVENTION

This invention concerns a low-orbit satellite communications system for terminals, which may or may not be mobile and may be transmitter/receivers or just receivers.

Satellite communications with mobile terminals investigated up to the present use two types of orbit, namely geostationary satellite orbits and strongly inclined elliptical orbits, both with the property that they can be located, on the average, above the regions of space with strong concentrations of particles, known as Van Allen belts. Recently lower orbits have been considered, with altitudes located between 800 Km and 2000 Km. One characteristic of satellite communications systems which use such orbits is the possibility of communicating with a large number of mobile terminals, for example of portable type. However the poor radio performance of these terminals makes it necessary to provide compensation by way of superior radio performance of the satellite. The difference between the orbits at an altitude higher than the Van Allen belts and those at lower altitude lies in attenuation in space which is the less the closer the satellite is to the earth.

Depending on the frequency bands available there are two possible transmission systems. The first uses only the L band for the mobile-satellite links; the other uses the L and S bands. However, these systems can vary from country to country, since several transmission standards can be used, for example using TDMA access techniques, techniques of CDMA type, etc.

The communications system of the invention is compatible with "special mobile group" GSM standards. It is equally adaptable to CDMA transmission techniques. This system uses only one frequency band for the terminal-satellite links.

The object of the invention is thus to provide a particular transmission sequence, inasmuch as neither the satellite nor the terminal can receive and transmit at the same time. This makes it necessary to set up a transmission/reception frame and to establish special synchronization procedures, in time for a TDMA system and in time and in code for a CDMA system.

A CCIR Report (document No. US IWP 8/14-52, 1st Aug. 1990) entitled "Technical characteristics of a personal communication mobile-satellite system" describes a communications system by means of low orbit satellites with multi-beam antennas, each comprising 37 conical beams. Such a system suffers from the major problem of having a large number of beams which each form a small plot on the ground. Moreover changes in the beams can be produced with the passage of time, both because of the mobility of the users and because of the progression of the satellites. These are accompanied in general by a change of resources (handover). A high number of these in the course of a conversation spoils the quality of the link and affects listening comfort. Such a system has the disadvantage of a long transmission/reception frame.

SUMMARY OF THE INVENTION

The object of the present invention is to ameliorate these problems by teaching a communications system which allows the capacity of the satellites to be improved greatly, using a short transmission/reception frame.

To this end it provides a communications system between low-orbit satellites and terminals, characterized in that the beams of each satellite service area are turned on in accordance with a beam-hopping spatial scanning technique, in that transmission and reception are synchronized and separated in time for each satellite and each terminal, and in that time-division duplex is utilized.

In one embodiment, the communications antenna system of each satellite ensures uniform flux coverage through a plurality of beams, which may advantageously be elliptical, and elongate in the direction of progression of the satellite.

The invention will be set forth in more detail below, with the aid of the description and the accompanying drawings.

DESCRIPTION OF THE PREFERRED EMBODIMENTS

The system or "constellation" of satellites considered is a system with worldwide cover which complements existing terrestrial communications systems. In this system a terminal, whether or not mobile and whether a transmitter/receiver or just a receiver, is identified, located and connected by a satellite of the constellation through a gateway to the permanent public network, allowing access to all of the services of the public telephone network or of the future ISDN.

The radio resources allocated to the set of terminals are divided into satellite cells which each correspond to an area of small size in relation to the satellite service area and of large size relative to a terrestrial cell of a mobile network of the GSM (special mobile group) type. This cell is associated with a gateway station and the terminals belonging geographically to this area are associated with this station.

In such a satellite communications system there are two possible classes of low orbit:

polar orbits, whose planes pass through the poles (or quasi-polar to take account of sun-synchronous orbits, i.e. orbits whose planes remain fixed in space). These orbits have the property of ensuring, in principle, continuous whole earth coverage;

inclined orbits, whose planes make a given angle, in practice less than 60°, with the plane of the equator. Continuous coverage is then provided in two bands with edges parallel to the equator and symmetrical about the equator.

Each type of orbit has points of intersection between the planes of the orbits. In the case of polar orbits, they intersect in the vicinity of the poles. In the case of inclined orbits, they intersect in the vicinity of the equator. Furthermore, the service area of a satellite is determined by geometrical conditions: it comprises the set of points on the earth where the satellite is observed with an elevation (the angle made by the line from the user to the satellite with the plane tangent to the ground at the location of the terminal) greater than a predetermined value (which lies in the range 10° to 15° in practice).

These two orbit types have the same property that the service areas of the satellites overlap at different places or times:

in the case of polar orbits it is approaching the poles that the service areas gradually overlap;

in the case of inclined orbits the description of the overlap phenomenon is more complex but, in certain areas, it can amount to 100%. There are even satellite constellations which give quadruple coverage in some areas.

Such a property is advantageous, since it allows calls to be established with at least two satellites in most cases. The concept of the system of the invention takes account of this multiple coverage to avoid interference between service areas. The access mode for these satellites in low orbit equally takes account of this problem of interference.

Figure 1:
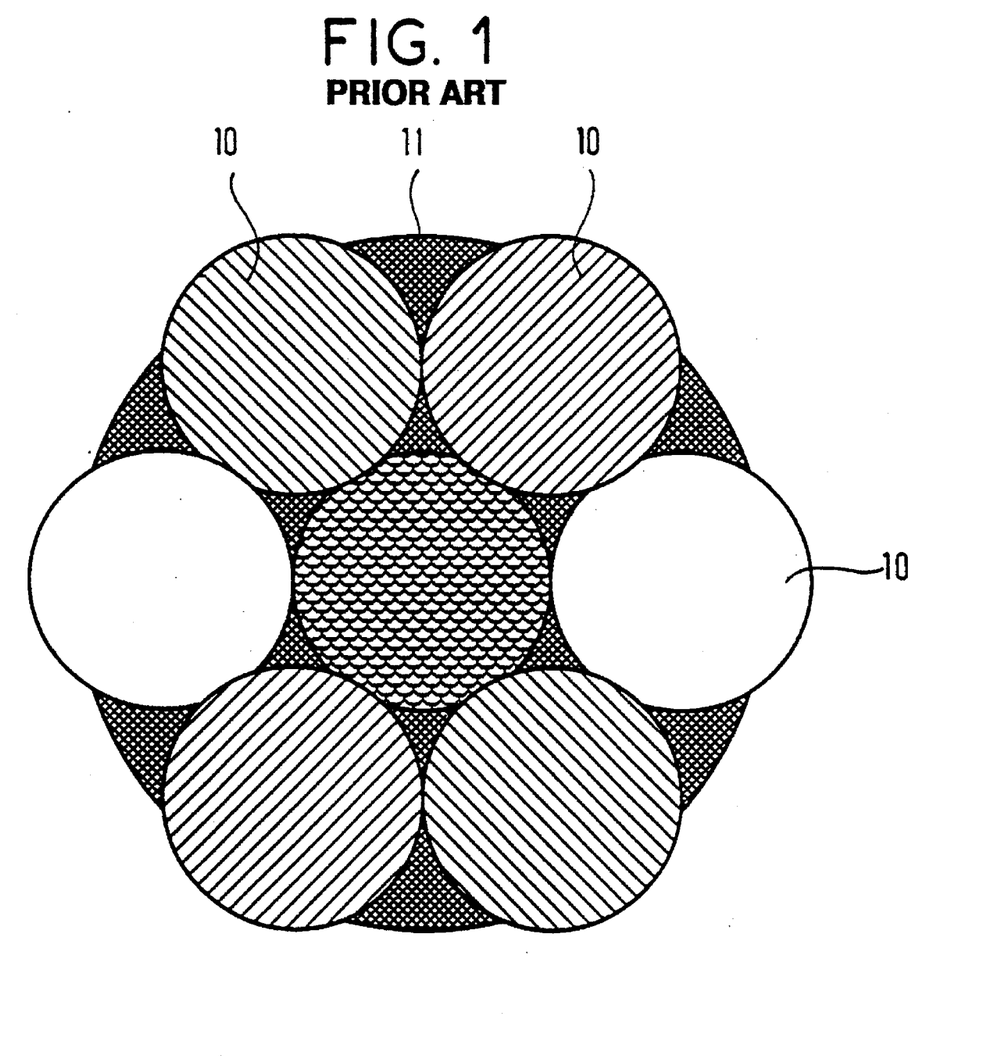
FIG. 1 shows a service area in a prior art satellite communications system.

In prior art satellite communications systems, such as that defined above, a coverage area is formed on the ground with the aid of a plurality of beams 10, as shown in FIG. 1. The useful coverage is the area 11. Such a coverage has several problems. In the path from the satellite to the terminal there are several areas in which the interference power is very high. These areas, whether in TDMA (time division multiple access) or CDMA (code division multiple access) are material to dimensioning, i.e. they play a large part in determining the size, weight and cost of the satellite in question. If the orbits are more inclined, the interference can lead to a link being interrupted for several tens of seconds. Moreover, such coverage with narrow beams requires resources to be changed rather frequently. In systems in which the number of beams is large, this leads to changes in resources every few minutes for example. The expense of processing then involved on the ground is far from negligible.

Moreover, both in CDMA in which the near-far effect can be very large, and in TDMA/FDMA or FDMA (frequency division multiple access), in which the bad effects of carriers of large amplitude on those which are less powerful are known, it is desirable to have antenna gain such that the power received on the ground (per unit area) is as uniform as possible. As is well known in the art, the near-far effect refers to the principle that signal power decreases in proportion to the square of the transmitted distance, and thus near transmissions tend to "drown out" far transmissions.

Figure 2:
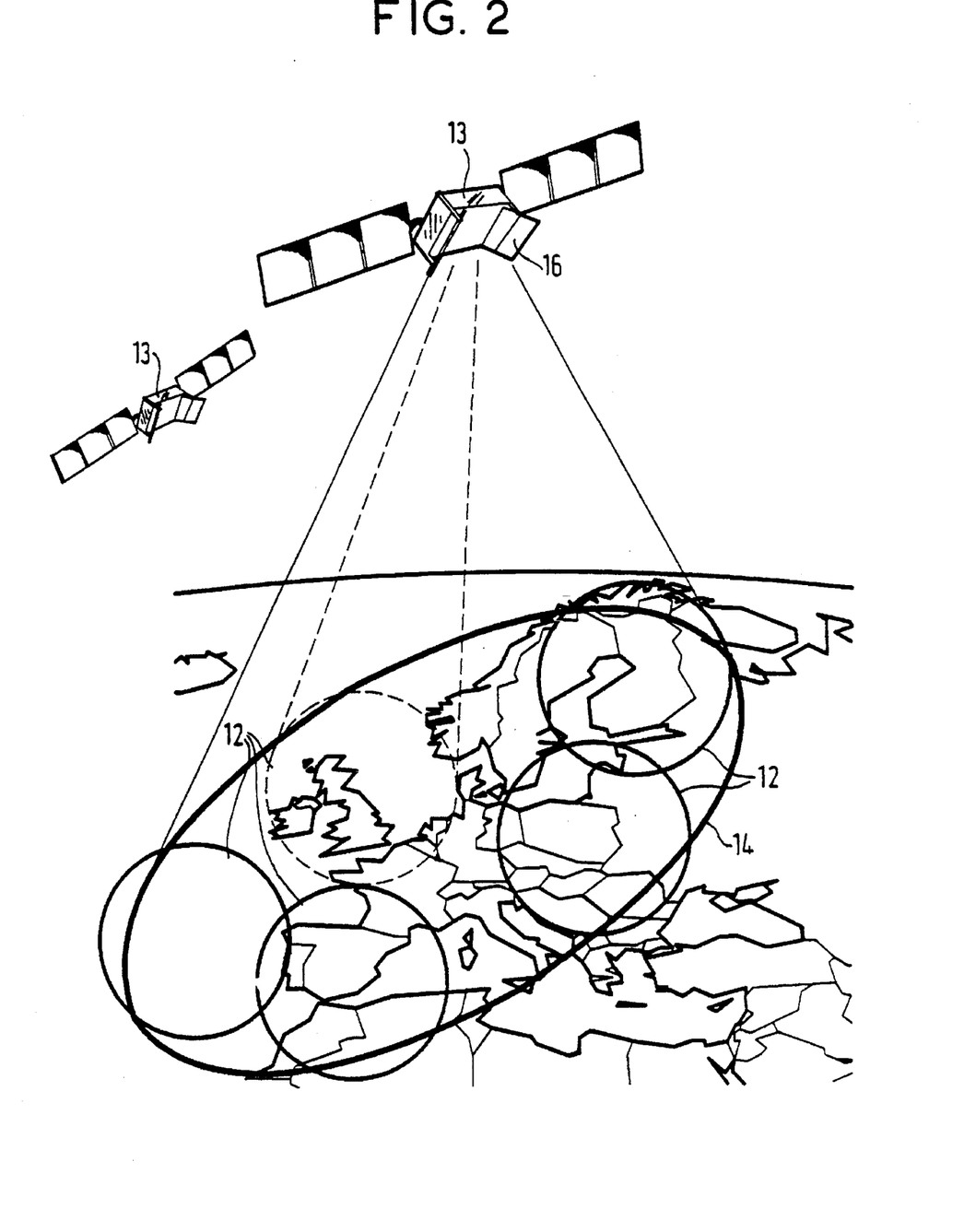
FIG. 2 illustrates the satellite communications system of the invention.

Like terrestrial systems of radio-communications with mobile stations, the satellite system of the invention, such as that shown in FIG. 2, is a cellular system for which the cells of the largest size are formed by the plots on the ground of different coverage beams 12 of each multi-beam satellite 13. From a radio point of view, a cell is characterized by a set of resources (frequencies, intervals of time, codes) in which the terminal becomes an element for establishing a call. The system of the invention is a system with N beams 12.

In the example illustrated in FIG. 2, the ground coverage 14 of a satellite 13 of the constellation is shown. Groups of several spots 12 are turned on is succession, selected from the N spots of the satellite, sequentially. This operation is effected both in transmission and in reception, which leads naturally to a transmission frame. In general terms, the coverage is built up from a set of N spots (which may be circular, elliptical or of any other shape), turned on simultaneously according to a beam-hopping law.

Transmission and reception in the different spots conform to the scheme of satellite frames considered later.

Thus, in the case of a multi-beam system there are two means for overcoming interference between neighboring beams pertaining to the same satellite:

each of the beams is permanently turned on and limitation of interference between beams is made possible by a frequency allocation scheme. The whole available band is not then used in a beam.

the whole available band is used in a beam. The technique which overcomes interference between neighboring beams is spatial scanning or beam hopping. Simultaneously switched on beams are sufficiently far apart spatially for their levels of mutual interference to be acceptable.

As to limitation of interference between beams from different satellites, when two or more satellites cross or approach each other, their plots on the ground overlap to a greater or lesser extent. Such events occur relatively frequently in a multi-beam system. Furthermore, additional interference can result from propagation over the horizon. This random interference cannot in this case be limited by the beam-hopping technique.

Among all existing access modes, several modes make a judicious compromise between performance (number of channels) and complexity (and hence cost) of the demodulator. This applies to modes using either separation of signals by frequency (FDMA) or separation in time (TDMA) or code separation (CDMA) or hybrid modes, a CDMA-TDMA combination for example.

The most advantageous modes are those which can be compatible with the modes used for cellular networks on the ground. These are three in number:

frequency division access mode (FDMA) using frequency duplexing. This requires four frequency bands to establish a link: two frequency bands to establish the links between the terminal and the satellite and two frequency bands to establish the links between the satellite and the fixed stations of the ground network (connecting links).

A capacity of slightly less than 40 carriers per MHz and per narrow beam can be attained, (half-rate GSM type or speech signal coded at 4800 bits/second).

time division access mode (TDMA), in particular one which increases the data rate in such a way that respective users only have access to the satellite during short intervals pre-assigned to each of them. In the system of the invention several carriers per frequency band are used in such a way that the data rate will not be too high. The selected data rate is that of the ground cellular network which the satellite system complements. For example, in Europe the GSM network (ETSI European standard) is chosen for preference, in the United States the DAMPS network (US digital standard). In this kind of access, since the frequency band used by each carrier is higher than the Doppler effect, beam-hopping is used. However, beam-hopping requires synchronization between transmission and reception, both for the satellite and for the terminal. Several solutions are then possible, depending on the frequency bands which are available to the mobile station:

in the conventional case in which two frequency bands are available for the mobile terminal-to-satellite links it is possible to simplify the structure of the terminal by using transmission and reception that are always separated in time, (this technique being called "time-division duplex" and denoted TDD). The access principle then adhered to is as follows: to establish a call a frequency resource is allocated (choice of a carrier frequency), then within this resource the transmission instants are defined. Synchronization has to be ensured by the terminal and the gateway station. This is effected firstly in a special channel, and then in the transmission channel where transmission instant is changed incrementally.

in the case of a single frequency band for the mobile terminal-to-satellite links, operation in TDD for the mobile terminals and the satellite is obligatory. This leads to a particularly simple assignment of satellite resources. Synchronization of transmission from a mobile terminal is effected using firstly a special channel, then by using a closed loop method which increments or decrements the transmission instant. In this case, as in the preceding case, centralized management of the frequency resources enables interference to be limited. Moreover, having to make rapid changes in resources (handover) is not ruled out since the system of the invention is required to supplement a ground network which already has these features. The management is effected on the following principle: above a certain satellite altitude, the geographical areas in which there is a possibility of interference are restricted. In these areas only are resources allocated by spectrum. In all others, a terminal can have access to the whole spectrum. Nevertheless, it is possible to find a cure for interference without having recourse to total central management of the system, by using frequency hopping at a low rate, such that, if there is interference, it will exist for a short time only.

The capacity which can then be obtained is slightly less than 35 carriers per MHz. (This capacity seems lower than that referred to for FDMA but it is necessary to take account of the fact that there is only one band of frequencies; this type of system actually has almost twice the capacity). The main advantage of this type of system is that it allows use of a very simple assignment of satellite resources.

the code division access mode (CDMA), otherwise known as "spread spectrum" enables a decentralized solution to the problems of interference. The use of spread spectrum allows several carriers to be superimposed, originating from one or more satellites. This mode can be used either with FDD type access (transmission and reception having different frequency bands) or with TDD type access.

In the case of two frequency bands for the mobile terminal-to-satellite links, both FDD and TDD access types are possible. A TDD type of solution allows reduction of the interference rate resulting from multiple coverage in the case of inclined orbits. Thus, when there is superimposed coverage, there is local degradation of capacity, which can be compensated for by a system of power control. Such a system is used essentially in the satellite-to-terminal path. It enables each user to be guaranteed a minimum call quality. In a multiple coverage situation, certain users are penalized by too great interference power. On the other hand, if this interference is not too great, it is possible to increase the satellite power assigned to these users. The total resultant increase in power is minimal in principle. However it has an impact on the quality of the links of other users, who then see their interference power increased. The use of a power control system thus has limitations which cannot be avoided.

As in the case of TDMA, it is possible to operate with a single frequency band. In this case the access procedure is of TDD type. However, spreading the spectrum poses some specific problems. Demodulation of spread spectrum signals assumes that the receiver is capable of recovering the timing reference used in transmission. Two methods can then be used: either reconstruction of the reference timing from the received signals (but the use of long codes made necessary by the number of users simultaneously present in the system makes this method very complex to use) or storing the timing reference in memory, then reconstituting it during reception by estimating the variations which may exist between reception of two packets.

The main problem with TDD access is the initial acquisition of transmission synchronization. This synchronization is effected firstly in open loop, then in closed loop with the aid of the station which controls the network. In a first interval, a terminal acquires the signalling channel of the network. Then, if it is required to transmit, a first message is sent whose reception makes it possible to define the time delay, which it is appropriate to apply in order to be in perfect synchronism. Once this synchronization of the loop has been attained and the terminal is synchronized, tracking and control of the synchronization is effected by measurement of the synchronization in the terrestrial station providing the interface with the switched telephone network. However, there is a particularly simple case of TDD operation in which this procedure does not have to be applied and in which the reception of the signal by the terminal is sufficient on its own to provide the synchronization information, this being the case in which only the terminal operates in TDD. In this case, the terminal operates with two frequencies, but alternately. As soon as it receives a signal from the satellite, it transmits. At the satellite, on account of the differences in distance, it is not possible to receive all the signals from terminals in the same beam simultaneously. Satellite transmission is framed with beam-hopping, i.e. it is effected alternately byway of half the number of beams, each transmitting beam being separated from another by a non-transmitting beam. In the following interval of time the reverse applies. However, reception by the satellite must be continuous because of the time dispersion arising from the dispersion of distances. Code access is sensitive to the amplitude dispersion of the various carriers at the same frequency. Strictly orthogonal codes (for example Walsh-Hadamard codes), that are perfectly synchronized are used to ensure that this effect is not significant. (However synchronization is never perfect with low orbit satellites, although it can be very good.) The shape of coverage obtained with the aid of the satellite antennas is thus very significant, if it is desired to avoid what is known as the "near-far problem". In other words, the large amplitude carriers interfere much more than the small amplitude carriers. In a system which is functioning correctly, all the carriers are brought to levels that are as close as possible.

In the system of the invention there are two possibilities for synchronization which lead to two different frame structures. Firstly however it is convenient to identify the constraints.

The adopted satellite constellation ensures that every point on the ground is covered by at least two satellites, so that it is necessary to control the interference between satellites. The most troublesome interference is that emanating from a satellite at a low elevation when a high elevation satellite is in use;

It is necessary to have coverage by narrow beams to establish a compatible balance with the constraints arising from the use of portable terminals. The minimum number is six service areas. Thus the interference of one beam with another should be controlled, which leads, in TDMA, to the use of beam-hopping. Of six beams, two or three will be turned on simultaneously, leaving two or one separating beams between the active radio beams.

In the system of the invention only a single frequency band is available; it is thus necessary to operate in alternation. Such alternation of operation must be possible both for a mobile station located near the sub-satellite point and for a mobile station at the edge of the service area.

The latter constraint allows two frame structures to be considered:

a) In one structure satellite transmissions E in each of the beams are linked in time in the same way as the instants of reception R. Frame duration is then determined by the time-division duplex operation of the mobile station farthest from the satellite. Assuming that the instants of transmission and of reception in each beam are of the same duration, this constraint is expressed by the following inequality:

$$(n-1)Te \geq 2Dmax/c$$

$$F=2nTe$$

where:

n is the number of instants of transmission,

Te is the duration of each of these instants,

Dmax is the maximum distance (at the minimum elevation),

F is the duration of the frame.

Figure 3:
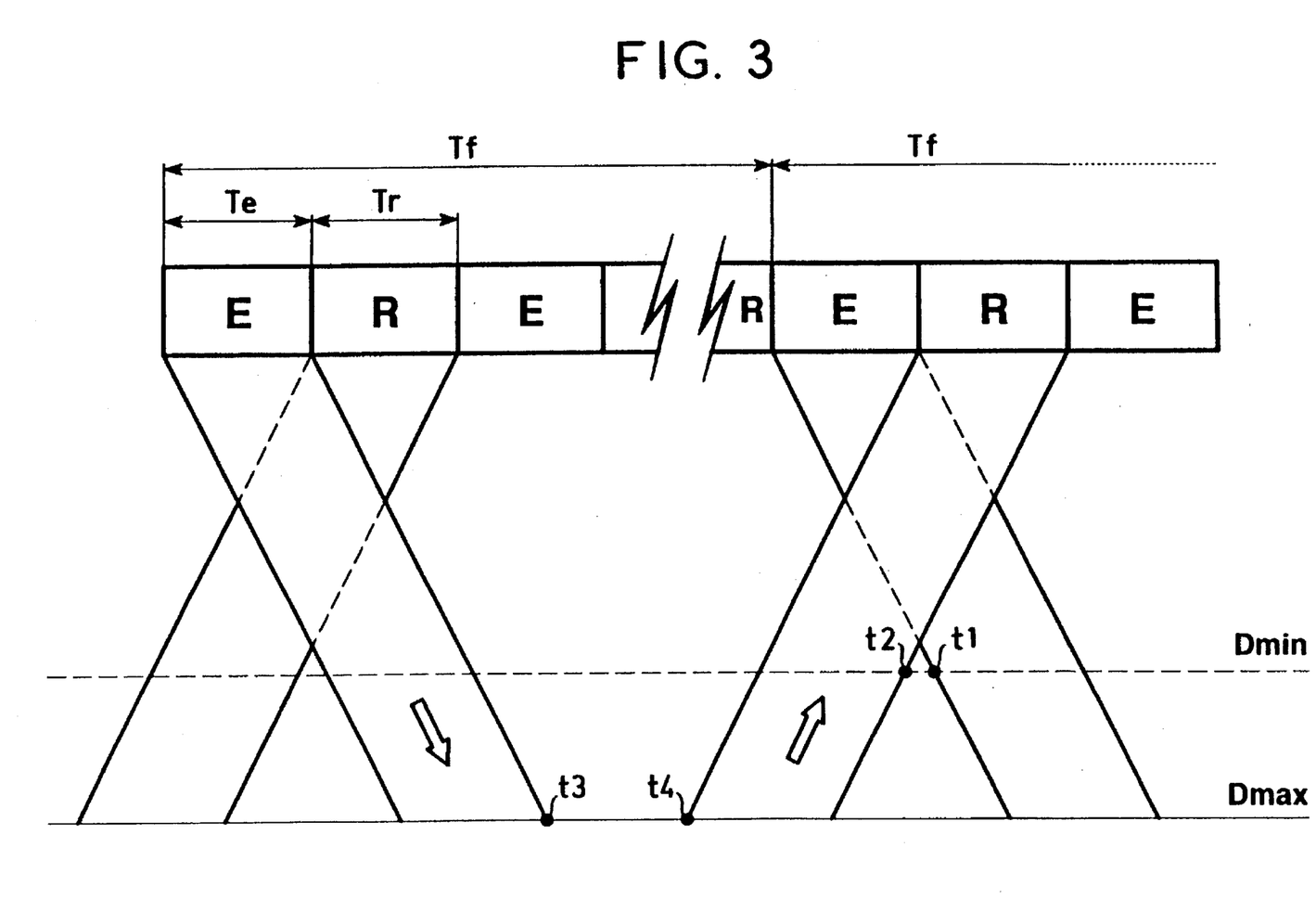
FIGS. 3 and 4 show two types of transmission/reception frames for the system shown in FIG. 2.

Such a frame, called "short", is shown in FIG. 3. It comprises a succession of transmission-reception pairs, forming a frame of length Tf. For a given transmission, the corresponding reception occurs one frame later.

The conditions for non-collision of transmission-reception packets is interpreted geometrically by the separation of the E/R bands drawn in full lines in the range of altitudes between Dmin and Dmax.

Figure 4:
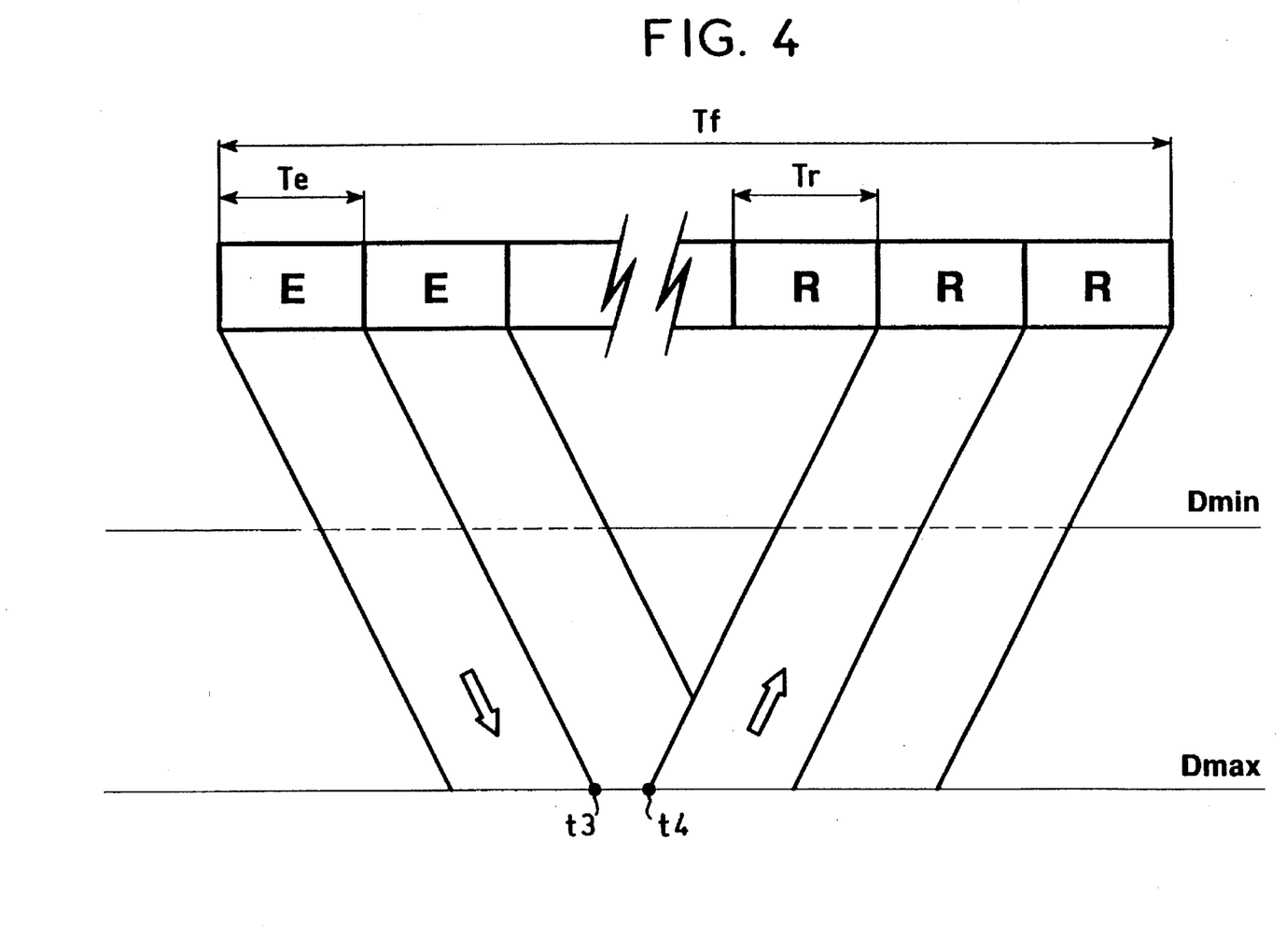

In one particularly advantageous embodiment of the system of the invention shown in FIG. 4, groups of two spots selected from the 6 spots of the satellite are illuminated in succession. This operation is effected both in transmission and in reception. In this system the geometrical shape of the of the beams 12 has been modified; from circular they have become elliptically elongated. The time of communication without handover is thus increased appreciably. The major axis of the ellipse is located parallel to the direction 15 of progression of the satellite. In this manner, as long as the user remains visible from the satellite, that user is illuminated continuously by the same beam throughout the call. The adoption of a restricted number of elongate elliptical beams thus imports a definite advantage at the system level: the complexity of several sub-systems is reduced (flow control, antenna) and the management of certain functions is simplified at the global level (management of communications and resources). Greater flexibility and greater availability of the system for communication with mobile terminals thus result.

The system of the invention advantageously comprises satellite constellations belonging to the group of constellations known as and classified under the name "symmetrical Walker constellations". (On this topic, the article by J. G. Walker entitled "Continuous whole earth coverage by circular orbit satellites" appearing in "Satellite systems for mobile communications and surveillance"; IEEE conference publication 95; 1973). These constellations are symmetrical beth as to the distribution of satellites in the same orbit and as to the equal inclination of their orbital planes in space. They are chosen because they allow the number of satellites for a given coverage to be minimized and they are particularly effective in covering a band of latitudes.

A Walker constellation is characterized by five parameters:

Altitude, here 1389 km (for reasons of length of life).

Inclination.

The triplet of parameters T/P/F:

T is the total number of satellites,

P is the number of orbital planes,

F is the phase parameter which indicates the relative positions of the satellites of one orbital plane to the next.

To optimize coverage of inhabited areas, i.e. lying between the equator and latitude 65° (north and south), requires a Walker constellation (1389 km, 52°, 48/8/1). This constellation has the advantage of allowing optimum coverage of the area, especially from the point of view of elevation, but it has the disadvantage, as with all constellations having a large number of satellites of requiring at least two years to be put into place. The system which is used therefore has two constellations, which can be put in place in succession.

The constellations used are the following:

Walker constellation (1389 km, 47°, 24/08/3), which provides proper coverage of the contiguous United States (CONUS) and of the south of Europe (typically up to the latitude of Lille), but which has large gaps in coverage below latitude 30°.

Walker constellation (1389 km, 55°, 24/08/3), which covers the rest of the world and allows optimization of coverage, especially in elevation for countries between latitudes 10° and 60°.

Thus at 10° elevation and 1389 km altitude, this leads to: (n−1)Te≧23.05 ms, namely 5 GSM frames.

If n=2 is selected, the minimum frame duration is then 4Te, namely F=92.3 ms.

If n=3 is selected, the value for Te which suits in a GSM frame is 3. This leads to F=83.07 ms.

If n=6 is selected, the value of Te is one GSM frame and F =55.38 ms.

The periods are long and it is necessary to note that, as n increases, the capacity of the band decreases.

b) The other possibility is to alternate transmission and reception on each of the groups of beams operating simultaneously. Alternate operation leads to two constraints, one arising from the terminals near the zenith, the other from those near the edge of the service area. The two inequalities which determine these constraints are:

for terminals having the satellite at zenith:

$$Te+Tr \leq 2Dmin/c$$

for the terminals at the limit of coverage:

$$m(Te+Tr)=F$$

$$F \geq 2Dmax/c,$$

where:

Te is the ON-time of a transmitting beam,

Tr is the ON-time of a receiving beam,

Dmin is the minimum distance (altitude of the satellite),

Dmax is the distance between the satellite and the mobile station at the edge of the area at minimum elevation, m is the number of transmit-receive pairs forming the frame, f is the duration of the frame.

Such a frame, known as "long" is shown in FIG. 4. In one frame period all transmissions occur followed by the corresponding receptions. The condition for non-collision is interpreted geometrically by the spacing of the E/R bands up to a distance Dmax.

Figure 5:
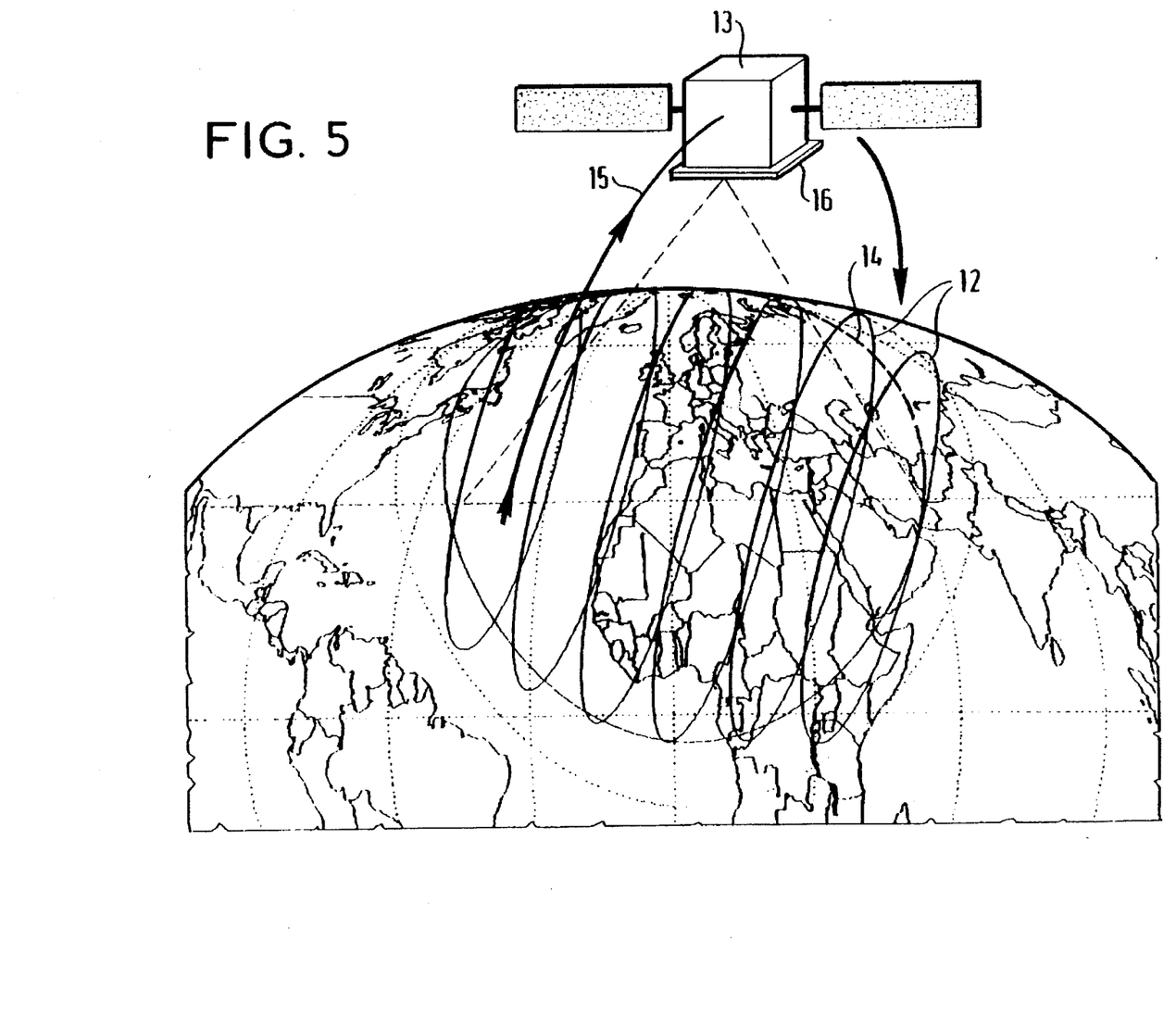
FIG. 5 shows a particular embodiment of the system of the invention.

In the embodiment shown in FIG. 5:

The first given constraint, assuming Te=Tr, Te≦4.63 ms, allows taking:
Te=1 GSM frame=4.615 ms;

The second constraint gives:
at 10° elevation, F>23.07 ms or F>5.01 GSM frames, where m=3 and F=27.69 ms.
at 20° elevation F>18.39 ms or F>3.98 GSM frames, where m=2 and F=18.46 ms.

In an advantageous implementation based on the system shown in FIG. 5 a synchronizing method is selected with a short frame, F=18.46 ms since once the constellation is in place in most regions of the globe, elevation exceeds 20°. During the start-up phase, a double frame duration may be selected so as to be able to operate at zero elevation. Since the two frames can operate simultaneously in the low latitudes, which are also the regions of little traffic, the frame duration can be 36.92 ms. Even and odd terminals are then distinguished, each operating with a single spacing frame. The double frame system allows the capacity of the satellites to be maximized.

The only problem which can occur is the transmission of a terminal of one parity at a low elevation during reception from a terminal of the other parity located in the vicinity of the former. However, there are two remedies for this situation, which probability calculations show to occur infrequently. The first relies on the assignment of resources from the same station. Thus the two terminals pertain in principle to the same gateway, since they are near to one another. The algorithm for assignment of resources can be such that the even and odd terminals do not have access to the same channel, which solves the problem in principle for the great majority of operational situations. The second is to effect a handover on detecting persistent interference.

The selected frame structure, seen from the satellite, thus comprises two transmission-reception intervals, the transmission duration being equal to that of reception. The duration of a transmission interval is equal to that of a GSM frame, namely 4.615 ms. The duration of the base frame is four GSM frames but a mode of operation with double duration is possible, to take account of a mode of operation at elevations less than 20°.

The structure of the GSM frame is thus imposed because of the constraint of the altitude of the satellites. It should be noted that the organization (arrangement in time) of the frames cannot be adhered to as such, at least in this mode of alternate operation. However it is operationally possible to set up the same types of channels, even if the numbering is modified.

The frame sequence is preserved, as are the modulation and the packet duration. The signalling channels are kept identical. With an additional delay, of some milliseconds, nearly the same procedures can be applied.

It is clear that the present invention has only been described and shown by way of preferred example and that its parts could be replaced by equivalent parts without however departing from the scope of the invention.

We claim:

1. A communications system, comprising:
   low-orbit satellites, each of said satellites providing ground coverage over respective service areas by using a plurality of radiation beams; and
   a plurality of ground terminals, located within said service areas, and communicating with said satellites over respective links;
   wherein the beams of each of said service areas are switched on in accordance with a beam-hopping technique;
   wherein transmission and reception, for each of said plurality of ground terminals and each of said low-orbit satellites communicating over each of said respective links, are (1) synchronized and (2) separated in time;
   wherein an identical frequency band is used for said transmission and said reception; and
   wherein time-division duplex is utilized for each of said respective links.

2. A communications system according to claim 1, wherein each satellite comprises a communications antenna system which ensures uniform flux coverage through the plurality of beams.

3. A communications system according to claim 2, characterized in that the beams are elliptical beams elongated in the direction of passage of the satellite.

4. A communications system according to claim 1, characterized in that the access mode of the satellites is a TDMA mode.

5. A communications system according to claim 1, characterized in that the access mode of the satellites is a CDMA mode.

6. A communications system according to claim 1, characterized in that the satellites have a polar orbit.

7. A communications system according to claim 1, characterized in that the satellites have an inclined orbit.

8. A communications system according to claim 7, characterized in that it employs two Walker type satellite constellations.

9. A communications system according to claim 1, wherein a footprint of said beams on the ground forms a cell of said satellite communications system.

10. Assignment of resources of a satellite forming part of a communications system according to claim 1, of which the coverage is formed by a set of spots which are the plots on the ground of different service area beams of each satellite, characterized in that the said assignment of resources illuminates in succession groups of spots selected among the N spots of the satellite, in a sequence according to a beam-hopping law.

11. Assignment of resources of a satellite forming part of a communications system according to claim 1, characterized in that interference between beams is avoided by means of a frequency allocation scheme.

12. Assignment of resources of a satellite forming part of a communications system according to claim 1, characterized in that said assignment of resources uses all of the available band in a beam and in that interference between beams is avoided by said beam-hopping technique with space diversity.

13. Assignment of resources of a satellite forming part of a communications system according to claim 1, characterized in that said assignment of resources is adapted to provide beams elongated in the direction parallel to the passage of the satellite in such a manner as to reduce the number of handoffs which have to be made during the course of the same communication.

14. The communication system according to claim 1, wherein at least one of said terminals first effects open loop synchronization with one of said satellites using signals received from a network-controlling station, and then effects closed loop synchronization with said one of said satellites.

15. A terminal forming part of a communications system according to claim 1, characterized in that said terminal sends a synchronizing first message indicating a time delay which is appropriate for perfect synchronization.

16. An interconnection earth station forming part of a communications system according to claim 1, characterized in that said station comprises means for tracking and controlling the synchronization of receptions and transmissions of terminals and satellites of said system.

17. A communications system, comprising:

- low-orbit satellites, each of which (1) provides ground coverage over respective service areas by using elliptical radiation beams elongated in a satellite direction of passage, and (2) comprises a communications antenna system that ensures uniform flux coverage through said beams;
- ground terminals, located within said service areas, and communicating with said satellites over respective links; and
- an interconnection earth station comprising means for tracking and controlling the synchronization of said respective links;
- wherein the beams of each of said service areas are switched on in accordance with a space diversity beam-hopping technique;
- wherein a ground footprint of each of said beams forms a respective cell of said communications system;
- wherein transmission and reception, for each of said ground terminals and each of said satellites communicating over each of said respective links, are (1) synchronized and (2) separated in time;
- wherein an identical frequency band is used for said transmission and said reception; and
- wherein time-division duplex is utilized for each of said respective links.

18. The communications system as set forth in claim 17, wherein said satellites have an access mode selected from the group consisting of TDMA and CDMA.

19. The communications system as set forth in claim 18, wherein at least one of said terminals first effects open loop synchronization with one of said satellites using signals received from a network-controlling station, and then effects closed loop synchronization with said one of said satellites.

20. The communications system as set forth in claim 18, wherein at least one of said terminals sends a synchronizing first message indicating a time delay appropriate for perfect synchronization.

21. The communications system as set forth in claim 1, wherein:

- said plurality of ground terminals communicate with said satellites over said respective links according to a communications frame; and
- said communications frame has a duration determined by said time-division duplex operation of a farthest one of said plurality of ground terminals which, within a respective one of said service areas, is farthest from a communicating one of said satellites.

22. The communications system as set forth in claim 21, wherein:

- said communications frame has transmission time periods and reception time periods interleaved on a one by one basis.

23. The communications system as set forth in claim 21, wherein:

- said communications frame has transmission time periods and reception time periods, said transmission time periods being not interleaved with said reception time periods.

24. The communications system as set forth in claim 17, wherein:

- said plurality of ground terminals communicate with said satellites over said respective links according to a communications frame; and
- said communications frame has a duration determined by said time-division duplex operation of a farthest one of said plurality of ground terminals which, within a respective one of said service areas, is farthest from a communicating one of said satellites.

25. The communications system as set forth in claim 24, wherein:

- said communications frame has transmission time periods and reception time periods interleaved on a one by one basis.

26. The communications system as set forth in claim 24, wherein:

- said communications frame has transmission time periods and reception time periods, said transmission time periods being not interleaved with said reception time periods.

* * * * *